US012764678B2

(12) United States Patent
Kumar et al.

(10) Patent No.: US 12,764,678 B2
(45) Date of Patent: Oct. 13, 2026

(54) MAXIMUM PERMISSIBLE EXPOSURE COMPLIANT BEAMFORMING RESOURCE SET

(71) Applicant: Nokia Technologies Oy, Espoo (FI)

(72) Inventors: Dileep Kumar, Espoo (FI); Satya Krishna Joshi, Oulu (FI); Mikko Säily, Espoo (FI); Taylan Sahin, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 332 days.

(21) Appl. No.: 18/414,662

(22) Filed: Jan. 17, 2024

(65) Prior Publication Data

US 2024/0284350 A1 Aug. 22, 2024

(30) Foreign Application Priority Data

Feb. 17, 2023 (FI) ..................................... 20235202

(51) Int. Cl.
*H04W 52/36* (2009.01)
*H04W 16/28* (2009.01)
*H04W 24/10* (2009.01)

(52) U.S. Cl.
CPC ......... *H04W 52/367* (2013.01); *H04W 16/28* (2013.01); *H04W 24/10* (2013.01)

(58) Field of Classification Search
CPC .... H04B 7/0695; H04W 16/28; H04W 24/10; H04W 52/367; H04W 72/046
See application file for complete search history.

(56) References Cited

U.S. PATENT DOCUMENTS 8,565,205 B2 10/2013 Ho et al.
10,291,309 B2 5/2019 Chakraborty et al.
11,184,863 B2 * 11/2021 Laghate ............... H04B 7/0404
(Continued)

FOREIGN PATENT DOCUMENTS

CN 115606104 A * 1/2023 ........... H04L 1/0025
CN 116671185 A * 8/2023 ............ H04W 52/42
(Continued)

OTHER PUBLICATIONS

"On FR2 RF Exposure mitigation methods", 3GPP TSG RAN WG1 Meeting #96bis, R1-1905229, Agenda: 5, Nokia, Apr. 8-12, 2019, 3 pages.
(Continued)

*Primary Examiner* — Eric Nowlin
(74) *Attorney, Agent, or Firm* — Carter, DeLuca & Farrell LLP

(57) ABSTRACT

Disclosed is a method comprising obtaining measurement information comprising radio environment measurements associated with a user device; determining, based at least on the measurement information and a maximum permissible exposure limit, one or more beamforming resource sets for the user device such that the maximum permissible exposure limit is not exceeded with at least one beamforming resource set of the one or more beamforming resource sets; and transmitting a message indicative of the at least one beamforming resource set to be used for selecting at least one transmit beam direction at the user device in case the maximum permissible exposure limit is exceeded.

1 Claim, 6 Drawing Sheets

(56) References Cited

U.S. PATENT DOCUMENTS

| | | | | | |
|---|---|---|---|---|---|
| 11,362,723 | B2 * | 6/2022 | Farag | H04B 7/0626 |
| 11,855,738 | B2 * | 12/2023 | Zhou | H04B 7/063 |
| 12,301,272 | B2 * | 5/2025 | Yuan | H04W 52/367 |
| 12,317,327 | B2 * | 5/2025 | MolavianJazi | H04W 74/0833 |
| 12,494,822 | B2 * | 12/2025 | Yuan | H04B 7/0404 |
| 2019/0074854 | A1 * | 3/2019 | Raghavan | H04B 1/3838 |
| 2019/0141692 | A1 | 5/2019 | Subramanian et al. | |
| 2019/0200365 | A1 | 6/2019 | Sampath et al. | |
| 2019/0261289 | A1 * | 8/2019 | Raghavan | H04W 52/367 |
| 2020/0112926 | A1 | 4/2020 | Laghate et al. | |
| 2020/0112927 | A1 | 4/2020 | Han et al. | |
| 2020/0260385 | A1 | 8/2020 | Ding et al. | |
| 2020/0383067 | A1 | 12/2020 | Liu et al. | |
| 2020/0413409 | A1 | 12/2020 | Zhou et al. | |
| 2021/0314952 | A1 * | 10/2021 | Taherzadeh Boroujeni | H04W 72/53 |
| 2021/0359745 | A1 * | 11/2021 | Farag | H04L 1/0071 |
| 2021/0391913 | A1 * | 12/2021 | Zhou | H04B 7/063 |
| 2021/0399783 | A1 * | 12/2021 | Onggosanusi | H04B 7/06966 |
| 2021/0410130 | A1 * | 12/2021 | Rahman | H04B 7/06964 |
| 2022/0007299 | A1 | 1/2022 | Rahman et al. | |
| 2022/0167333 | A1 * | 5/2022 | Raghavan | H04B 7/06952 |
| 2022/0345197 | A1 * | 10/2022 | Farag | H04W 72/21 |
| 2022/0377799 | A1 * | 11/2022 | MolavianJazi | H04W 74/0833 |
| 2023/0040162 | A1 * | 2/2023 | Yuan | H04B 7/0695 |
| 2023/0422185 | A1 * | 12/2023 | Yuan | H04W 52/365 |
| 2024/0015663 | A1 * | 1/2024 | Yuan | H04W 52/42 |
| 2024/0049148 | A1 * | 2/2024 | Yuan | H04W 52/365 |
| 2024/0187945 | A1 * | 6/2024 | Balan | H04W 36/008375 |
| 2024/0214020 | A1 * | 6/2024 | Dai | H04W 52/367 |
| 2024/0284350 | A1 * | 8/2024 | Kumar | H04W 52/367 |
| 2024/0429973 | A1 * | 12/2024 | Yuan | H04B 7/0404 |
| 2025/0286602 | A1 * | 9/2025 | Laddu | H04B 7/0696 |

FOREIGN PATENT DOCUMENTS

| | | | | | |
|---|---|---|---|---|---|
| EP | 4111760 | B1 * | 9/2025 | H04W 52/365 |
| KR | 20220044588 | A * | 4/2022 | H04B 17/328 |
| KR | 20230017225 | A * | 2/2023 | H04B 7/06952 |
| KR | 20230024272 | A * | 2/2023 | H04B 17/328 |
| WO | WO-2020076841 | A1 * | 4/2020 | H04W 52/365 |
| WO | 2021/159265 | A1 | 8/2021 | |
| WO | 2021/159266 | A1 | 8/2021 | |
| WO | WO-2021168642 | A1 * | 9/2021 | H04L 5/001 |
| WO | WO-2021169829 | A1 * | 9/2021 | H04B 7/06952 |
| WO | WO-2021230686 | A1 * | 11/2021 | H04W 72/21 |
| WO | WO-2021234223 | A1 * | 11/2021 | H04B 7/0696 |
| WO | WO-2021257487 | A1 * | 12/2021 | H04B 17/328 |
| WO | WO-2022012395 | A1 * | 1/2022 | H04W 52/365 |
| WO | WO-2022036685 | A1 * | 2/2022 | H04W 52/365 |
| WO | 2022/129695 | A1 | 6/2022 | |
| WO | WO-2022151121 | A1 * | 7/2022 | H04W 52/365 |
| WO | WO-2022151356 | A1 * | 7/2022 | H04W 52/367 |
| WO | WO-2022235033 | A1 * | 11/2022 | H04W 52/365 |
| WO | WO-2023217387 | A1 * | 11/2023 | H04W 52/0235 |
| WO | WO-2024137207 | A1 * | 6/2024 | G01S 13/08 |

OTHER PUBLICATIONS

"Enhancements on Multi-beam Operation", 3GPP TSG RAN WG1 Meeting #103-e, R1-2009250, Agenda: 8.1.1, Qualcomm Incorporated, Oct. 26-Nov. 13, 2020, pp. 1-12.

"LS on FR2 MPE", 3GPP TSG-RAN WG4 Meeting #89, R4-1816756, RAN WG4, Nov. 12-16, 2018, 1 page.

"Mitigating Radio Link Failures due to MPE on FR2", 3GPP TSG-RAN WG4 Meeting #92, R4-1908820, Agenda: 9.13.1, Nokia, Aug. 26-30, 2019, 5 pages.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

Finnish Application No. 20215033, "Uplink Sounding Configuration Signalling", filed on Jan. 13, 2021, pp. 1-44.

"3rd Generation Partnership Project, Technical Specification Group Radio Access Network; Evolved Universal Terrestrial Radio Access (E-UTRA); Physical channels and modulation (Release 11)", 3GPP TS 36.211, V11.6.0, Sep. 2014, pp. 1-120.

Shahrivar et al., "Determining Electromagnetic Exposure Compliance of Multi-Antenna Devices in Linear Time", IEEE Transactions on Antennas and Propagation, vol. 67, No. 12, Dec. 2019, pp. 7585-7596.

Mo et al., "Beam Codebook Design for 5G mmWave Terminals", IEEE Access, vol. 7, Jul. 22, 2019, pp. 98387-98404.

"IEEE 802.11", Wikipedia, Retrieved on Dec. 1, 2023, Webpage available at : https://en.wikipedia.org/wiki/IEEE_802.11.

"IEEE 802.15", Wikipedia, Retrieved on Dec. 11, 2023, Webpage available at : https://en.wikipedia.org/wiki/IEEE_802.15.

Office action received for corresponding Finnish Patent Application No. 20235202, dated Aug. 30, 2023, 14 pages.

Extended European Search Report received for corresponding European Patent Application No. 23220832.2, dated Jun. 27, 2024, 10 pages.

"Remaining Issues on Multi-beam operation", 3GPP TSG RAN WG1 #98, R1-1909048, Agenda: 7.2.8.3, Apple Inc., Aug. 26-30, 2019, 12 pages.

* cited by examiner

MAXIMUM PERMISSIBLE EXPOSURE COMPLIANT BEAMFORMING RESOURCE SET

FIELD

The following example embodiments relate to wireless communication.

BACKGROUND

In wireless communication, a user device may be required to comply with a maximum permissible exposure limit, which indicates the level of radio frequency energy exposure that is considered to be safe for human exposure. There is a challenge in how to enable the user device to comply with the maximum permissible exposure limit.

BRIEF DESCRIPTION

The scope of protection sought for various example embodiments is set out by the claims. The example embodiments and features, if any, described in this specification that do not fall under the scope of the claims are to be interpreted as examples useful for understanding various embodiments.

According to an aspect, there is provided an apparatus comprising at least one processor, and at least one memory storing instructions that, when executed by the at least one processor, cause the apparatus at least to: obtain measurement information comprising radio environment measurements associated with a user device; determine, based at least on the measurement information and a maximum permissible exposure limit, one or more beamforming resource sets for the user device such that the maximum permissible exposure limit is not exceeded with at least one beamforming resource set of the one or more beamforming resource sets; and transmit a message indicative of the at least one beamforming resource set to be used for selecting at least one transmit beam direction at the user device in case the maximum permissible exposure limit is exceeded.

According to another aspect, there is provided an apparatus comprising: means for obtaining measurement information comprising radio environment measurements associated with a user device; means for determining, based at least on the measurement information and a maximum permissible exposure limit, one or more beamforming resource sets for the user device such that the maximum permissible exposure limit is not exceeded with at least one beamforming resource set of the one or more beamforming resource sets; and means for transmitting a message indicative of the at least one beamforming resource set to be used for selecting at least one transmit beam direction at the user device in case the maximum permissible exposure limit is exceeded.

According to another aspect, there is provided a method comprising: obtaining measurement information comprising radio environment measurements associated with a user device; determining, based at least on the measurement information and a maximum permissible exposure limit, one or more beamforming resource sets for the user device such that the maximum permissible exposure limit is not exceeded with at least one beamforming resource set of the one or more beamforming resource sets; and transmitting a message indicative of the at least one beamforming resource set to be used for selecting at least one transmit beam direction at the user device in case the maximum permissible exposure limit is exceeded.

According to another aspect, there is provided a computer program comprising instructions which, when executed by an apparatus, cause the apparatus to perform at least the following: obtaining measurement information comprising radio environment measurements associated with a user device; determining, based at least on the measurement information and a maximum permissible exposure limit, one or more beamforming resource sets for the user device such that the maximum permissible exposure limit is not exceeded with at least one beamforming resource set of the one or more beamforming resource sets; and transmitting a message indicative of the at least one beamforming resource set to be used for selecting at least one transmit beam direction at the user device in case the maximum permissible exposure limit is exceeded.

According to another aspect, there is provided a computer readable medium comprising program instructions which, when executed by an apparatus, cause the apparatus to perform at least the following: obtaining measurement information comprising radio environment measurements associated with a user device; determining, based at least on the measurement information and a maximum permissible exposure limit, one or more beamforming resource sets for the user device such that the maximum permissible exposure limit is not exceeded with at least one beamforming resource set of the one or more beamforming resource sets; and transmitting a message indicative of the at least one beamforming resource set to be used for selecting at least one transmit beam direction at the user device in case the maximum permissible exposure limit is exceeded.

According to another aspect, there is provided a non-transitory computer readable medium comprising program instructions which, when executed by an apparatus, cause the apparatus to perform at least the following: obtaining measurement information comprising radio environment measurements associated with a user device; determining, based at least on the measurement information and a maximum permissible exposure limit, one or more beamforming resource sets for the user device such that the maximum permissible exposure limit is not exceeded with at least one beamforming resource set of the one or more beamforming resource sets; and transmitting a message indicative of the at least one beamforming resource set to be used for selecting at least one transmit beam direction at the user device in case the maximum permissible exposure limit is exceeded.

According to another aspect, there is provided an apparatus comprising at least one processor, and at least one memory storing instructions that, when executed by the at least one processor, cause the apparatus at least to: receive a message indicative of at least one beamforming resource set to be used in case a maximum permissible exposure limit is exceeded; select at least one transmit beam direction from the at least one beamforming resource set based on whether the maximum permissible exposure limit is exceeded; and transmit data in the selected at least one transmit beam direction.

According to another aspect, there is provided an apparatus comprising: means for receiving a message indicative of at least one beamforming resource set to be used in case a maximum permissible exposure limit is exceeded; means for selecting at least one transmit beam direction from the at least one beamforming resource set based on whether the maximum permissible exposure limit is exceeded; and means for transmitting data in the selected at least one transmit beam direction.

According to another aspect, there is provided a method comprising: receiving a message indicative of at least one beamforming resource set to be used in case a maximum permissible exposure limit is exceeded; selecting at least one transmit beam direction from the at least one beamforming resource set based on whether the maximum permissible exposure limit is exceeded; and transmitting data in the selected at least one transmit beam direction.

According to another aspect, there is provided a computer program comprising instructions which, when executed by an apparatus, cause the apparatus to perform at least the following: receiving a message indicative of at least one beamforming resource set to be used in case a maximum permissible exposure limit is exceeded; selecting at least one transmit beam direction from the at least one beamforming resource set based on whether the maximum permissible exposure limit is exceeded; and transmitting data in the selected at least one transmit beam direction.

According to another aspect, there is provided a computer readable medium comprising program instructions which, when executed by an apparatus, cause the apparatus to perform at least the following: receiving a message indicative of at least one beamforming resource set to be used in case a maximum permissible exposure limit is exceeded; selecting at least one transmit beam direction from the at least one beamforming resource set based on whether the maximum permissible exposure limit is exceeded; and transmitting data in the selected at least one transmit beam direction.

According to another aspect, there is provided a non-transitory computer readable medium comprising program instructions which, when executed by an apparatus, cause the apparatus to perform at least the following: receiving a message indicative of at least one beamforming resource set to be used in case a maximum permissible exposure limit is exceeded; selecting at least one transmit beam direction from the at least one beamforming resource set based on whether the maximum permissible exposure limit is exceeded; and transmitting data in the selected at least one transmit beam direction.

LIST OF DRAWINGS

In the following, various example embodiments will be described in greater detail with reference to the accompanying drawings, in which FIG. 1 illustrates an example of a wireless communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

Figure 1:
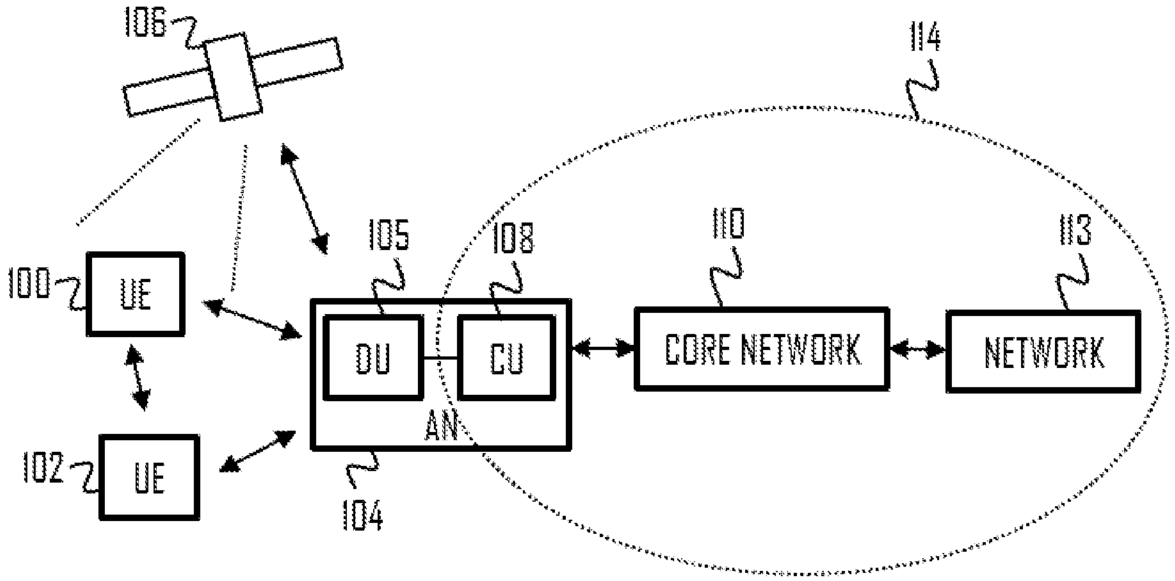

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved Node B (abbreviated as eNB or eNodeB) or a next generation Node B (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

Any feature described herein with a UE may also be implemented with a corresponding apparatus, such as a relay node. An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from an access node and forward it to a UE, and/or amplify a signal received from the UE and forward it to the access node.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The communication system may also comprise a central control entity, or the like, providing facilities for wireless communication networks of different operators to cooperate for example in spectrum sharing.

5G enables using multiple input-multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP)

and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105) and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

A UE may be required to comply with a regulatory maximum permissible exposure (MPE) limit and to comply with frequency range two (FR2) regulatory electromagnetic field (EMF) exposure limits. MPE is a term used in the field of radio frequency (RF) electromagnetic radiation safety to refer to the highest level of RF energy exposure that is considered to be safe for human exposure. The MPE may be determined based on international safety guidelines and standards, and it may take into account factors such as frequency, duration of exposure, and distance from the source of exposure. For example, the MPE may be measured in units of power density (e.g., $W/m^2$) or specific absorption rate (SAR) in watts per kilogram of body tissue.

To comply with the MPE limit, one possible solution is power management maximum power reduction (P-MPR), i.e., reducing the uplink transmit power to comply with the MPE limit. However, this may result in radio link failure or poor uplink coverage due to insufficient quality of the received signal at the serving gNB. For example, radio link failure may occur, if the received power from the UE is much lower than what the gNB configured for the UE.

Another possible solution to comply with the MPE limit is to restrict the maxUplinkDutyCycle capability. This approach may avoid high P-MPR and maintain cell coverage at the cost of lower throughput, and thus it may not be suitable for data transmissions. As an example, excessively limiting the uplink duty cycle may prevent uplink transmission (e.g., control feedback and data), thus leading to severe throughput loss, and potentially even to radio link failure.

Furthermore, it should be noted that if the UE is very close to a human user (e.g., at a distance comparable with the antenna array size), then restricting the maxUplinkDutyCycle may not be enough to comply with the MPE limit.

A larger antenna array at the gNB and UE may achieve higher effective isotropic radiated power (EIRP), and thus help to close the radio link, but the underlying MPE requirements still need to be satisfied. Furthermore, the current mobility solutions, such as the baseline handover and conditional handover may not provide robustness, and may also lead to significant latency issues. Therefore, in order to comply with the MPE limit, new techniques may be needed for example for higher frequency bands such as frequency range two (FR2) and beyond 52.6 GHz, as well as for near-field and sidelink communication scenarios.

The NR access link may operate in the millimeter wave (mmWave), sub-terahertz (THz) bands, and higher frequency ranges, which are intrinsically more susceptible to higher path loss and penetration loss. In the higher frequency ranges, both the gNB and the UEs may employ front-end circuits with, for example, multiple beam patterns to combat the drawbacks of the propagation channel.

In wireless communication, a beam refers to an electronically steerable antenna pattern that may be used to focus radio signals in a specific direction. A beam may be considered to be a communication resource, and different beams may be considered as different resources. A beam may also be represented as a spatial filter, spatial direction, or angle. A technology for forming a beam may be referred to as a beamforming technology. The beamforming technology may allow multiple beams to be created simultaneously. The beamforming technology may be a digital beamforming technology, analog beamforming technology, or a hybrid digital/analog beamforming technology. A wireless communication device (e.g., UE or gNB) may communicate with another wireless communication device via one or more beams.

In the context of uplink communication (i.e., UE to gNB communication), the directional beamforming for the uplink transmission may cause energy absorption in the nearby tissues of a human user, which may need to be constrained in terms of the MPE limit. In other words, the RF EMF exposure of the human user may need to comply with the relevant limit(s) defined by the regulatory authorities. In general, a gNB may be able to determine a UE transmit beam for the uplink transmission based on the UE's downlink measurement on one or more receive beams of the UE (using UL/DL beam reciprocity). However, the MPE may cause some potential uplink beam directions to become unusable for the uplink data transmission, thus leading to less uplink coverage and achievable throughput performance. In this case, the UL/DL beam reciprocity cannot be exploited.

The above issues may also be applicable to sidelink communication (i.e., UE to UE communication).

Figure 2:
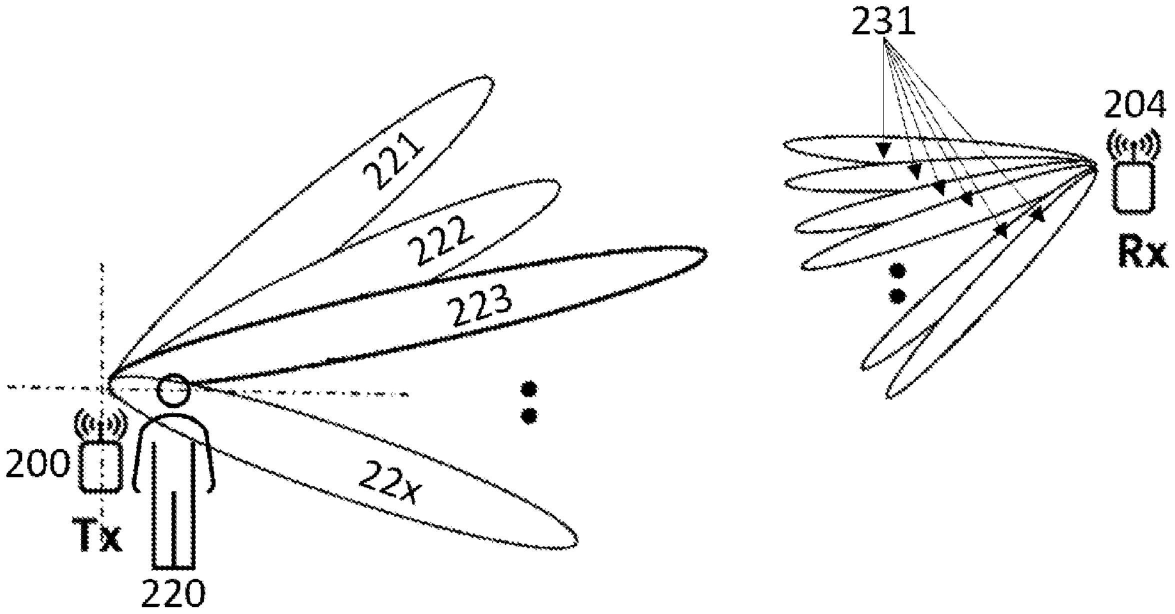
FIG. 2 illustrates an example of a system.

FIG. 2 illustrates an example of a wireless communication scenario, wherein an MPE event associated with a human user 220 restricts a transmitter 200 (e.g., UE) from using some transmit beam directions 221, 222, 223, . . . 22*x*. In FIG. 2, the UE 200 may determine to use, for example, the transmit beam direction 221 for its data transmission in order to comply with the MPE limit, since the beam direction 221 is directed away from the human user 220. However, transmitting the data transmission in the transmit beam direction 221 may cause the received signal strength or quality of the uplink data transmission to be degraded at the receiver 204 (e.g., gNB or another UE) in comparison to the other transmit beam directions 222, 223, 22*x*, since the receive beam(s) 231 of the receiver 204 point to different directions than the transmit beam direction 221.

Some example embodiments are described below using principles and terminology of 5G radio access technology without limiting the example embodiments to 5G radio access technology, however.

Some example embodiments may enable efficient uplink or sidelink beam designs to enhance UE throughput, uplink coverage, etc., while also complying with the MPE limit.

By exploiting the flexible NR frame and codebook structure, it may be possible to design an MPE-compatible uplink beamformer (e.g., using pseudorandom beamforming sequences, etc.). The use of a pseudorandom beamformer (e.g., use of Zadoff-chu sequence) provides an ability to exploit the multipath propagation (i.e., provides measurement diversity), instead of relying on a particular rank (direction), while keeping the main potential directions, such as the line of sight (LoS) and/or the shortest time of flight (ToF) path, for uplink communication. Thus, some example embodiments may increase the throughput even with reduced radiated power in the desired direction (which is limited by the MPE constraint). This property of a pseudorandom beamformer may solve the drawbacks of legacy techniques (e.g., reduced throughput, possibility of radio link failure, etc.), while maintaining the potential LoS direction, and thus provide more robustness in case of MPE events. In other words, by using pseudorandom Zadoff-Chu beams, the directions of maximum channel gain may be maintained while satisfying MPE constraints (e.g., by reducing the radiated power), and thus the UE can still communicate on the potential LoS path without P-MPR or switching to the second best beam.

In an example embodiment, based on the initial or available or obtained physical layer measurements, such as reference signal receiver power (RSRP), angle of arrival (AoA) and/or channel state information reference signal (CSI-RS) measurements, and/or statistical information (i.e., measurements from one or more previous time slots) associated with a UE, the gNB may pre-emptively determine UE-specific MPE-compatible beamforming resources for the UE. These resources may comprise, for example, at least one of: one or more beamforming codebooks, required UL transmit power, and/or ranking, control or selection metrics for the data transmissions of the UE. These resources may be designed to be more robust to MPE events for data transmission, and to avoid radio link failure.

In case of an MPE event (e.g., MPE limit being exceeded), the UE may autonomously select and optimize the best MPE-compatible beamforming vector from the configured resources, while satisfying the (minimum) expected received signal strength at the serving gNB for the UL data transmission.

In addition to uplink (UL) communication, some example embodiments may also be applied to sidelink (SL) communication scenarios.

Figure 3:
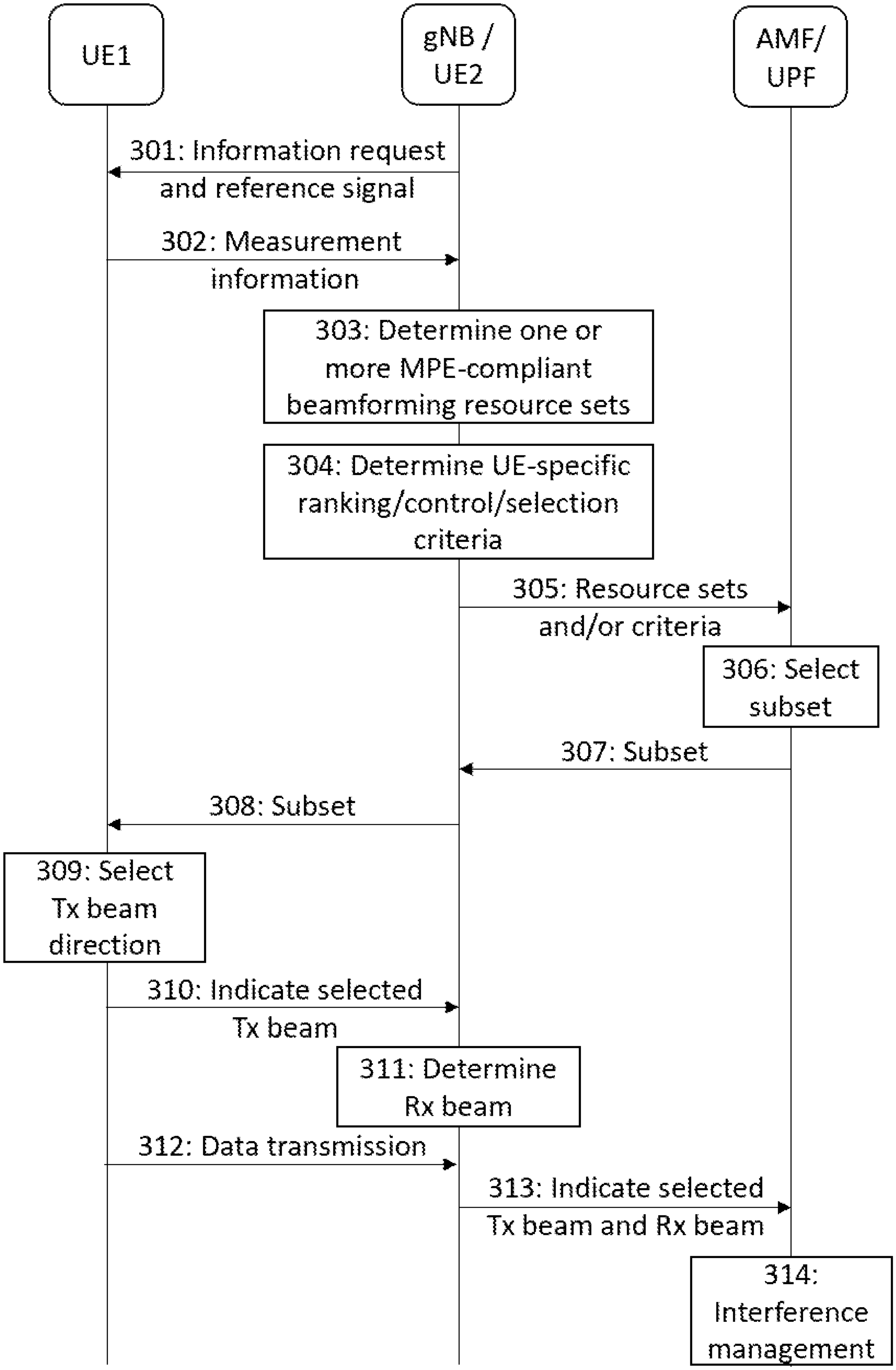
FIG. 3 illustrates a signal flow diagram.

FIG. 3 illustrates a signal flow diagram according to an example embodiment. In FIG. 3, UE1 may correspond to UE 100 of FIG. 1, or the transmitter 200 of FIG. 2. The gNB or UE2 of FIG. 3 may correspond to the access node 104 or UE 102 of FIG. 1, or the receiver 204 of FIG. 2. The AMF or UPF of FIG. 3 may correspond to the core network 110 of FIG. 1.

At 301, a node, such as a gNB or TRP or a second UE (UE2), transmits, to a first UE (UE1), an information request and one or more reference signals, wherein the information request indicates UE1 to measure the one or more reference signals and report the corresponding measurement information to the node.

For example, the reference signal may be a channel state information reference signal (CSI-RS), in case the information request is transmitted by the gNB or TRP (in an UL communication scenario), in which case UE1 may have an active radio link with the gNB or TRP (i.e., UE1 may be in RRC connected mode).

As another example, the reference signal may be a sounding reference signal (SRS) or a sidelink reference signal. For example, in a sidelink communication scenario, UE2 may be an anchor UE used for supporting positioning of UE1 by transmitting or receiving a sidelink positioning reference signal (SL-PRS) to or from UE1.

At 302, UE1 performs the measurements on the one or more reference signals (not shown in FIG. 3) and transmits the measurement information to the node. The node receives the measurement information from UE1. The measurement information comprises radio environment measurements associated with UE1. For example, the measurement information may comprise at least one of: RSRP, AoA, time, carrier phase, and/or CSI-RS measurements. The measurement information may be obtained by the node, for example, during the initial access and/or during one or more previous communication sessions.

At 303, the node determines, based at least on the measurement information and a maximum permissible exposure limit, one or more beamforming resource sets for UE1 such that the maximum permissible exposure limit is not exceeded with at least one beamforming resource set of the one or more beamforming resource sets.

As an example, the node may determine a set of UE-specific potential transmit beam directions for uplink or sidelink data transmission from UE1 based on the beam-domain RSRP and/or the time-delay profile and/or angle and/or phase and/or any other measurement information associated with UE1. After determining the set of UE-specific potential transmit beam directions, the node may pre-emptively determine (and optimize) the one or more MPE-compatible beamforming resource sets.

Figure 6:
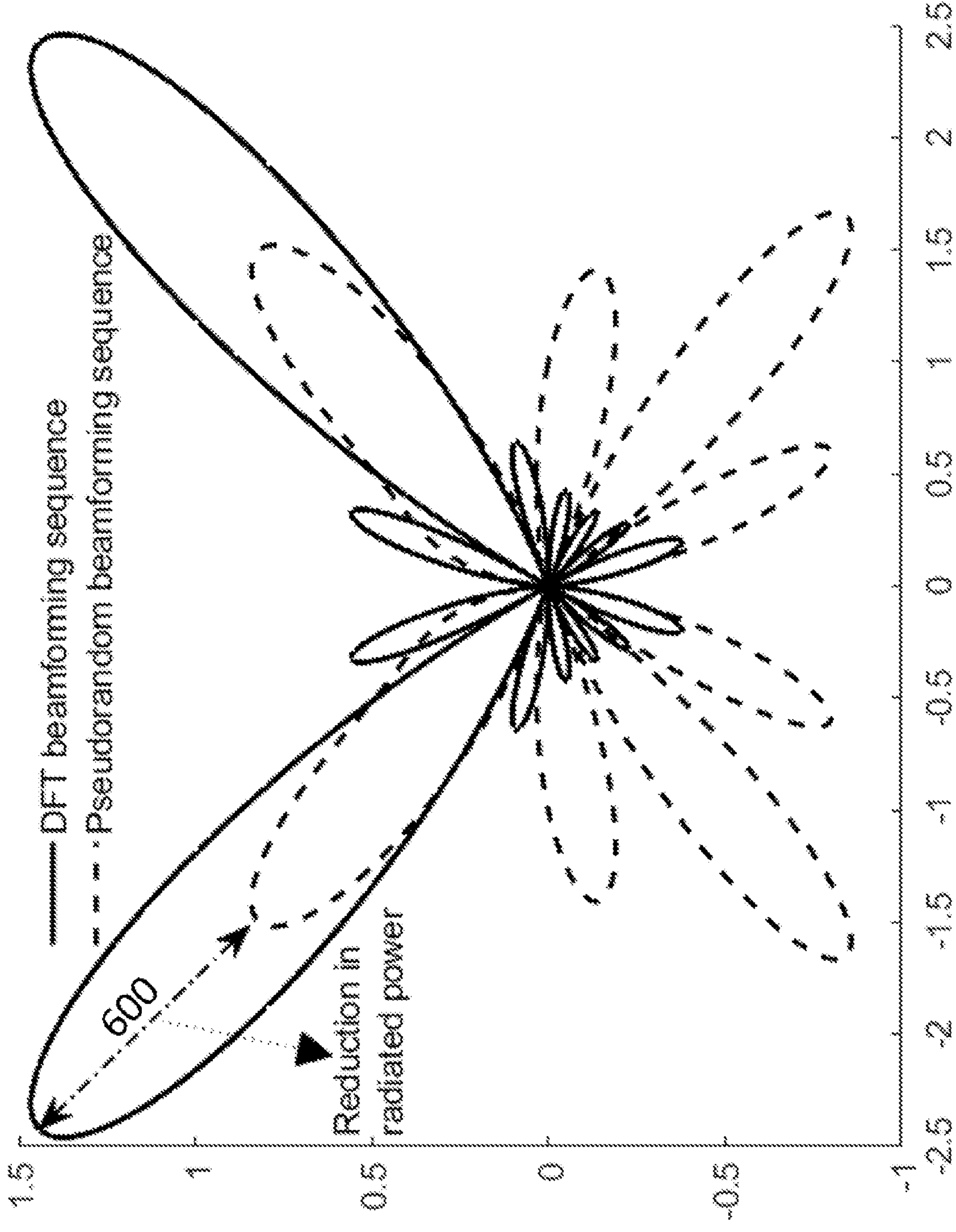
FIG. 6 illustrates a comparison of beamforming sequences.
Figure 7:
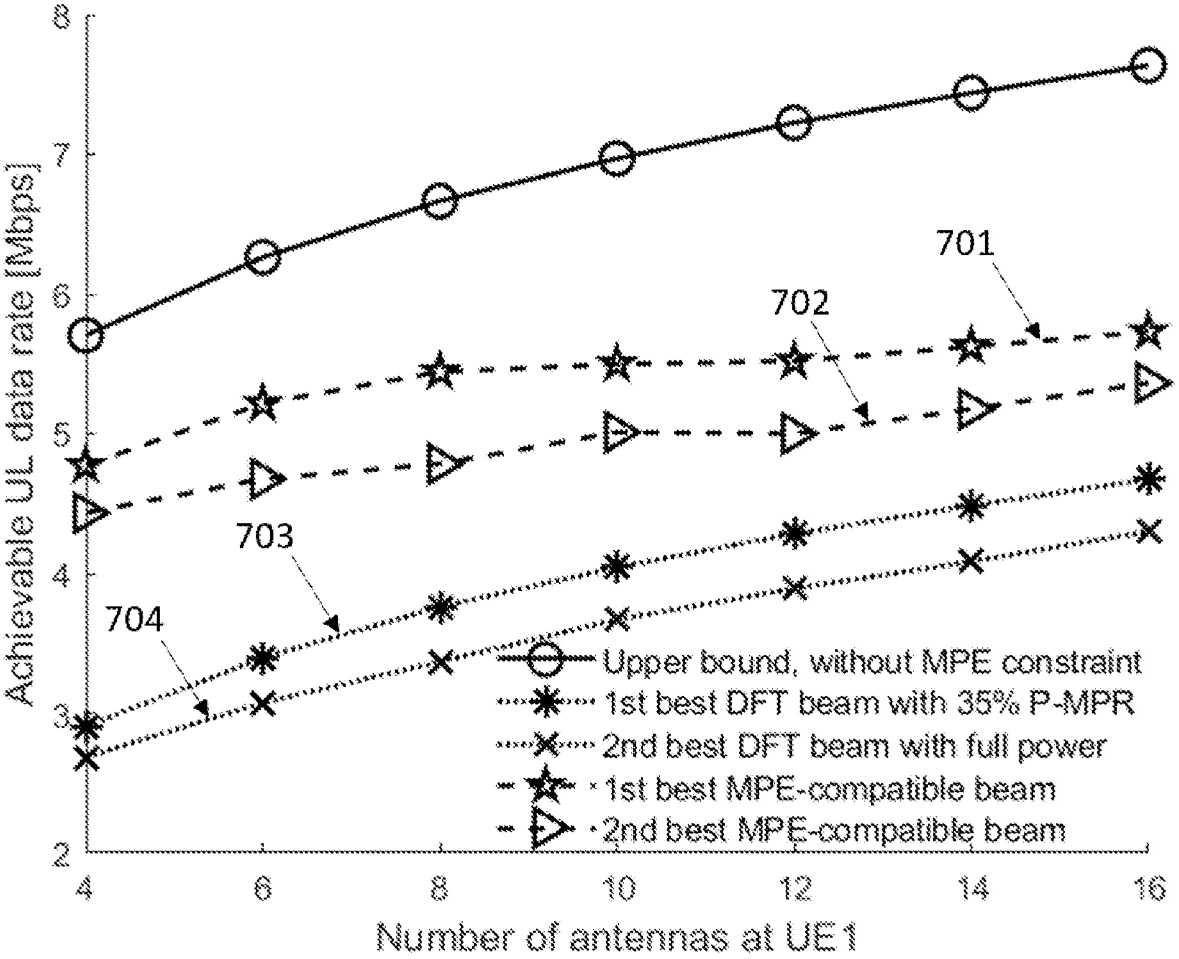
FIG. 7 illustrates simulated measurement results.

For example, a given beamforming resource set may comprise one or more beamforming codebooks. A beamforming codebook is a set of precoded beamforming weight vectors that may be used to control the transmission and/or reception of signals in wireless communication. The beamforming codebook may used in beamforming algorithms to form directional beams from UE1 towards the node for improved signal quality, reduced interference, and increased coverage, while complying with the MPE limit. The beamforming codebook may comprise beamshaping information and corresponding minimum transmit power level values required for the data transmission from UE1. As an example, the beamforming codebook may be based on a Zadoff-Chu sequence. For example, in comparison to discrete Fourier transform (DFT) beams, Zadoff-Chu beams may provide a significant reduction in the radiated power level (as shown in the example of FIG. 6), while also keeping the main potential directions (e.g., LoS and/or shortest ToF path) for uplink or sidelink communication, and thus achieving significant throughput gains (as shown in FIG. 7).

For example, the node may determine, based at least on the measurement information and the maximum permissible exposure limit, one or more transmit power levels corresponding to the one or more beamforming resource sets such that the maximum permissible exposure limit is not exceeded.

Alternatively, or additionally, the node may determine, based at least on the measurement information and the maximum permissible exposure limit, beamshaping information corresponding to the at least one beamforming resource set. The beamshaping information refers to the information used to shape the radiation pattern of a beam. This information may include the phase and amplitude weights assigned to a given element of an antenna array, which determine the direction and shape of the beam. This way, the beamshaping information may indicate to optimize the transmit beam(s) at UE1 to radiate an amount of power in one or more other directions than a direction associated with the maximum permissible exposure limit, such that the maximum permissible exposure limit is not exceeded, and such that an expected received signal strength of a data transmission received at the network node from UE1 is above a threshold.

At 304, in the case of a plurality of MPE-compatible beamforming codebook options, the node may also determine the corresponding ranking, control, and/or selection criteria for UE1. For example, the node may determine a ranking of a plurality of beamforming codebooks comprised in the at least one beamforming resource set. Alternatively, or additionally, the network node or UE2 may determine, based on the maximum permissible exposure limit, one or more criteria for selecting the at least one transmit beam direction from a plurality of transmit beam directions indicated in the at least one beamforming resource set.

For example, the ranking may indicate UE1 to start the beam selection process with a first beamforming resource set (e.g., first beamforming codebook) of a first beam, such as a DFT beam. If the radiated power of the first beam does not exceed the MPE limit, then UE1 may select the first beam (first beamforming resource set) to be used for its data transmission. Alternatively, if the radiated power of the first beam (first beamforming resource set) exceeds the MPE limit, then UE1 may proceed to evaluate the other beamforming resource set(s) according to the ranking until it finds a beamforming resource set with which the MPE limit is not exceeded. For example, if the MPE limit is exceeded with the first beam (first beamforming resource set), then UE1 may proceed to a second beamforming resource set (e.g., second beamforming codebook) of a second beam, such as a pseudorandom beam (non-DFT beam), according to the ranking to check whether the radiated power of the second beam exceeds the MPE limit. If the radiated power of the second beam (second beamforming resource set) does not exceed the MPE limit, then UE1 may select the second beam to be used for its data transmission. Alternatively, if the radiated power of the second beam (second beamforming resource set) exceeds the MPE limit, then UE1 may proceed to the next beamforming resource set according to the ranking to evaluate whether the MPE limit is exceeded with that resource set, and so on, until UE1 finds a beamforming resource set with which the MPE limit is not exceeded. In other words, UE1 may determine or compute the radiated power for each beam based on the ranking until it finds a beam with which the MPE limit is not exceeded. If none of the beamforming resource sets is compatible with the MPE limit (i.e., the MPE limit is exceeded with all of the beamforming resource sets), then UE1 may, for example, optimize its transmit power and/or apply beam shaping to try to avoid exceeding the MPE limit. If the MPE limit is still exceeded despite this optimization, then UE1 may declare radio link failure.

In the above example, it should be noted that the first beam in the ranking may also be a different type of beam than a DFT beam. Furthermore, the second beam in the ranking may also be a different type of beam than a pseudorandom beam.

As another example, the ranking may be based on the LoS and/or shortest ToF path such that the node may try to keep the LoS path between UE1 and the node by making UE1 select a Zadoff-Chu beam instead of a DFT beam, in case the MPE limit is exceeded with the DFT beam, since the Zadoff-Chu beam may be more likely to not exceed the MPE limit due to its omni-type radiations.

As another example, the ranking may be based on the expected received signal strength of a data transmission transmitted from UE1 to the node with a given beamforming codebook.

At 305, the node transmits information indicative of the one or more beamforming resource sets to a network entity, such as an AMF or UPF. The node may also transmit the measurement information associated with UE1 to the network entity. The node may also indicate the ranking and/or the one or more criteria to the network entity.

At 306, the network entity selects a subset of the one or more beamforming resource sets. The network entity may have information on active UEs in neighboring cells, and thus the network entity may efficiently select and/or optimize the subset of UE-specific MPE-compatible resources in order to avoid any excessive intra-cell or inter-cell interference, etc.

In other words, the node (e.g., gNB or UE2) first determines one or more beamforming resource sets for UE1 and transmits the resource set information to the network entity, and the network entity may further select (and possibly optimize) a subset of the one or more beamforming resource sets reported from the node by considering at least one of: the impact of intra-cell or inter-cell interference, the UE category of UE1, and higher layer requirements of UE.

For example, some beamforming directions may lead to severe inter-cell interference, and thus the network entity may proactively avoid or omit these options. For example, the network entity may configure different root Zadoff-Chu sequences for different UEs to avoid any excessive intra-cell or inter-cell interference. In general, the spatially separated Zadoff-Chu directions per UE may lead to better interference management in the uplink at the serving gNB, and thus, it may improve cell edge coverage and achievable data rate per UE.

Furthermore, by utilizing the higher layer requirements and UE category information, the network entity may prioritize a subset of UEs associated with stricter reliability and latency constraints, for example by configuring a plurality of alternative beamforming codebook(s), and/or ranking, control, and selection metrics, in order to avoid uplink power back-off, reduction of maxUplinkDutyCycle, and/or possibly radio link failure in case of an MPE event. For example, the network entity may prioritize UE1, as it may have stricter reliability and latency constraints than other UEs. Thus, radio link failure may be avoided by pre-emptively configuring UE1 with additional resources. Alternatively, or additionally, UE1 may be configured with better beamforming direction(s) (than other UEs) to achieve a high received signal-to-interference-plus-noise ratio (SINR) of the data transmissions transmitted from UE1.

At 307, the network entity transmits, to the node, information indicating the (optimized) subset of the one or more beamforming resource sets. The node receives the information indicating the (optimized) subset of the one or more beamforming resource sets from the network entity.

At 308, the node transmits, to UE1, a message, for example downlink control information (DCI) or sidelink control information (SCI), indicative of the subset of the one or more beamforming resource sets to be used for selecting at least one transmit beam direction at UE1 in case the maximum permissible exposure limit is exceeded. In other words, the node may configure and activate the (optimized) UE-specific MPE compatible resources to UE1 by using a shared and/or dedicated control channel. The node may also configure UE1 with scheduling information, for example resource elements, for the data transmission from UE1.

For example, the message may comprise information indicative of at least one transmit power level corresponding to the subset of one or more beamforming resource sets.

Alternatively, or additionally, the message may comprise the beamshaping information corresponding to the subset of one or more beamforming resource sets.

Alternatively, or additionally, the message may comprise information indicative of the ranking of the beamforming codebooks and/or the one or more criteria corresponding to the subset of one or more beamforming resource sets.

At 309, UE1 selects at least one transmit beam direction from the subset of one or more beamforming resource sets based on whether the maximum permissible exposure limit is exceeded at UE1. In other words, UE1 may select the at least one transmit beam direction based on detecting that the maximum permissible exposure limit is exceeded with its previous beam. For example, the at least one transmit beam direction may be selected based at least partly on the ranking and/or the one or more criteria.

If any MPE event is detected (i.e., if the MPE limit is exceeded with the previous beam), UE1 may autonomously select the best MPE-compatible beamformer from the set of (optimized) options configured by the node, which complies with the MPE constraints, while satisfying the expected received signal quality at the node for data transmission to the node.

For example, based on the one or more ranking, control, and/or selection criteria or metrics configured and activated by the node, UE1 may determine or compute the RF EMF exposure in ascending or descending chronological order of the configured transmit beam direction(s), select the best transmit beam direction with the least exposure, and accordingly adjust the corresponding transmit power level to satisfy the MPE limit, while meeting the expected received signal quality at the node.

For example, the MPE event can be detected via one or more in-built sensors of UE1. For example, a proximity sensor may be used to detect if a human body is close to UE1. As another example, UE1 may compare the maximum allowable transmission power levels to a pre-defined threshold associated with the MPE limit. The threshold may relate to, for example, a total radiated power, a maximum output power, an effective isotropic radiated power (EIRP), a radiated power on a single beam, a radiated power on a beam directed toward the human user of UE1, etc.

At 310, UE1 may transmit, to the node, an indication indicating the at least one transmit beam direction selected by UE1 from the subset of one or more beamforming resource sets. The node receives the indication. For example, UE1 may report, to the node, the index of the selected at least one MPE-compatible transmit beam direction and/or UE-selected potential transmit direction (e.g., angle information).

Alternatively, if UE1 was unable to select a suitable MPE-compatible beam direction from the subset of one or more beamforming resource sets, then UE1 may transmit, to the node, an indication indicating radio link failure and a request for a new beamforming resource set. In this case, UE1 may indicate one or more preferred transmit beam directions to the node in order to avoid successive radio link failure, and the node may then configure a new beamforming resource set to UE1 for example based on the one or more preferred transmit beam directions (if the node has the corresponding resources available).

At 311, the node may determine at least one receive beam based on the indication indicating the at least one transmit beam direction selected by UE1. For example, based on the selected at least one MPE-compatible transmit beam direction (e.g., beam index and/or angle information) of UE1, the node may optimize its corresponding receive beam(s) in order to improve the receive signal strength of the data transmission from UE1 and/or to avoid any potential interference on configured resources of other active UE(s). For example, the node may optimize its receive beam(s) by using beam shaping, reconfiguring beamforming weights, etc.

At 312, UE1 transmits a data transmission via the selected at least one transmit beam direction by using the data resources configured by the node. The data transmission may be transmitted such that the maximum permissible exposure limit is not exceeded, and an expected received signal strength of the data transmission is above a threshold. For example, the data transmission may be transmitted based at least on the at least one transmit power level and/or the beamshaping information. The node receives the data transmission from UE1 via the at least one receive beam determined by the node. The data transmission may comprise one or more bits of any kind of data.

In one example, UE1 may estimate an electromagnetic field exposure in the selected at least one transmit beam direction, and adjust a transmit power level of the data transmission in the selected at least one transmit beam direction such that the electromagnetic field exposure is below or equal to the maximum permissible exposure limit, and the expected received signal strength of the data transmission is above the threshold.

At 313, the node may transmit, to the network entity, a report message indicating the at least one receive beam determined by the node, and the at least one transmit beam direction selected by UE1. In other words, the information on the selected at least one MPE-compatible transmit beam at UE1 and the optimized receive beam(s) at the node may be reported to the network entity for further enhancement.

For example, this information may be useful in the intra-cell or inter-cell interference management and cancellation, thus improving the baseband signal processing, i.e., efficient decorrelation of different UEs' data on the configured time-frequency resource blocks at the network entity.

At 314, the network entity may use the information in the report message for example for at least one of: intra-cell or inter-cell interference management and cancellation, improving the baseband processing, and/or pre-emptive configurations in subsequent time instances. For example, the network entity may store the reported information as acquired statistical information, which may be used for more efficient pre-emptive configuration of one or more UE-specific MPE-compatible resources in subsequent data transmissions.

Figure 4:
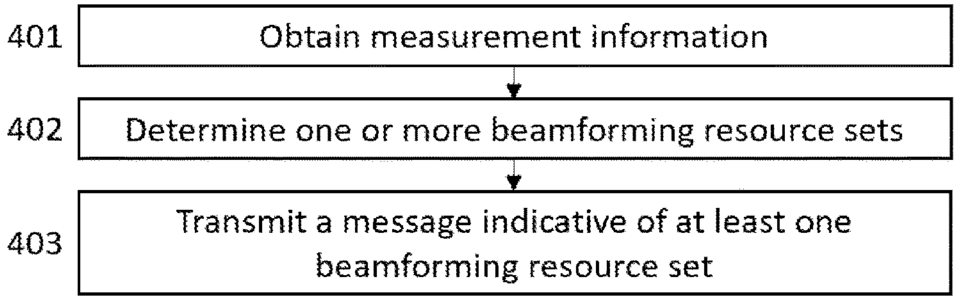
FIG. 4 illustrates a flow chart.

FIG. 4 illustrates a flow chart according to an example embodiment of a method performed by an apparatus. For example, the apparatus may be, or comprise, or be comprised in, a user device or a network node of a radio access network. The user device may correspond to UE 102 of FIG. 1, or the receiver 204 of FIG. 2, or UE2 of FIG. 3. The network node may correspond to the access node 104 of FIG. 1, or the receiver 204 of FIG. 2, or the gNB of FIG. 3.

Referring to FIG. 4, in block 401, the apparatus obtains measurement information comprising radio environment measurements associated with a user device (e.g., UE 100 of FIG. 1, or transmitter 200 of FIG. 2, or UE1 of FIG. 3). For example, the measurement information may comprise at least one of: RSRP, AoA, time, phase, and/or CSI-RS measurements. For example, the measurement information may be obtained by receiving, from the user device, a measurement report comprising the measurement information. Alternatively, or additionally, the measurement information may comprise historical (statistical) measurement information obtained from an external or internal database, for example.

In block 402, the apparatus determines, based at least on the measurement information and a maximum permissible exposure limit, one or more beamforming resource sets for the user device such that the maximum permissible exposure limit is not exceeded with at least one beamforming resource set of the one or more beamforming resource sets. The at least one beamforming resource set may comprise, for example, one or more beamforming codebooks.

For example, the apparatus may determine, based at least on the measurement information and the maximum permissible exposure limit, one or more transmit power levels corresponding to the one or more beamforming resource sets such that the maximum permissible exposure limit is not exceeded.

Alternatively, or additionally, the apparatus may determine, based at least on the measurement information and the maximum permissible exposure limit, beamshaping information corresponding to the at least one beamforming resource set.

Alternatively, or additionally, the apparatus may determine a ranking of a plurality of beamforming codebooks comprised in the at least one beamforming resource set. For example, the at least one beamforming resource set may comprise at least a Zadoff-Chu based beamforming codebook and a DFT-based beamforming codebook, wherein the Zadoff-Chu based beamforming codebook may be associated with a higher ranking than the DFT-based beamforming codebook in case the maximum permissible exposure limit is exceeded.

In block 403, the apparatus transmits a message indicative of the at least one beamforming resource set to be used for selecting at least one transmit beam direction at the user device in case the maximum permissible exposure limit is exceeded. For example, the message may be transmitted to the user device.

For example, the message may comprise at least one of: the ranking, the beamshaping information corresponding to the at least one transmit beam direction, and/or information indicative of at least one transmit power level corresponding to the at least one transmit beam direction.

Figure 5:
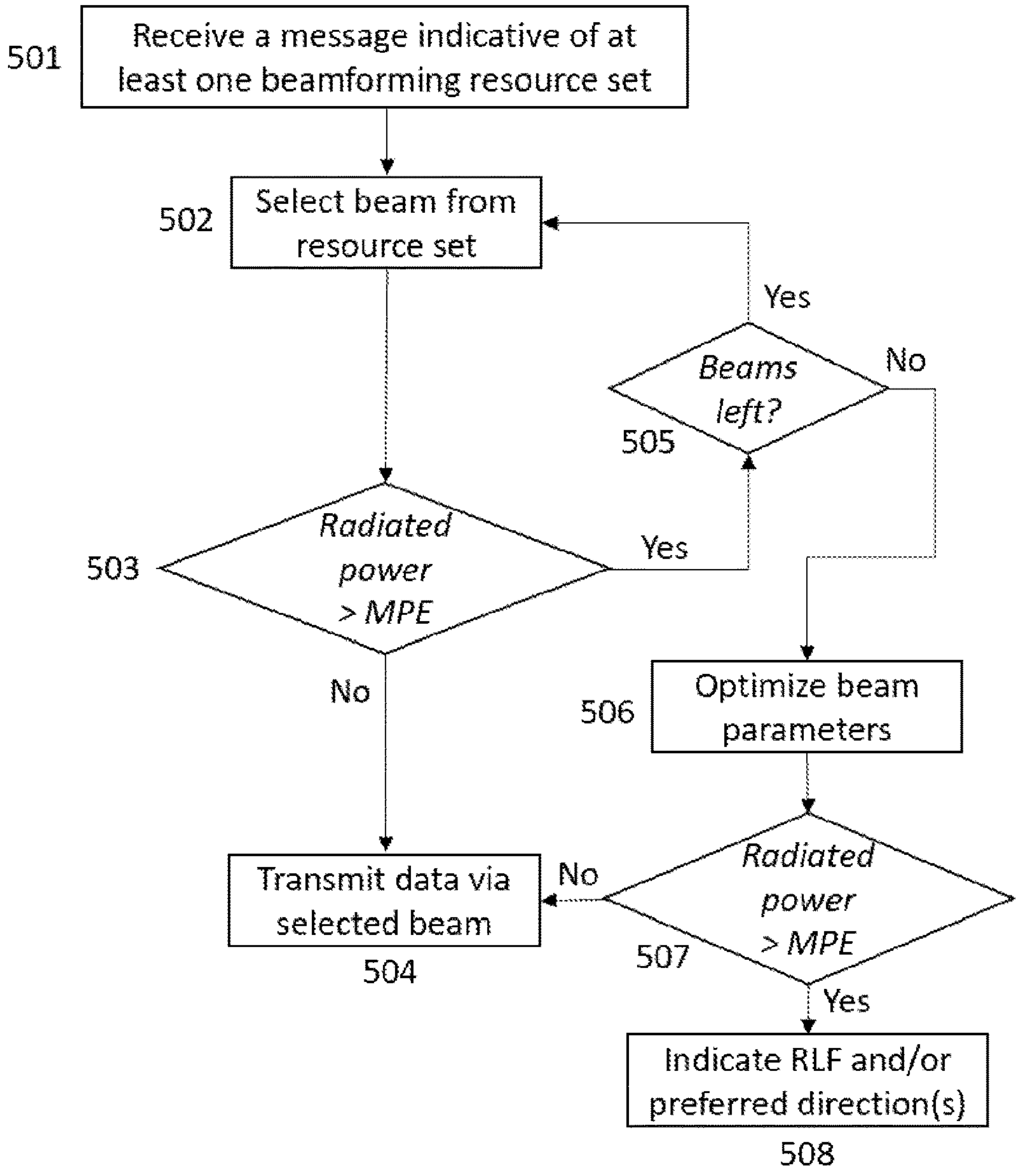
FIG. 5 illustrates a flow chart.

FIG. 5 illustrates a flow chart according to an example embodiment of a method performed by an apparatus. For example, the apparatus may be, or comprise, or be comprised in, a user device. The user device may correspond to UE 100 of FIG. 1, or the transmitter 200 of FIG. 2, or UE1 of FIG. 3.

Referring to FIG. 5, in block 501, the apparatus receives a message indicative of at least one beamforming resource set to be used in case a maximum permissible exposure limit is exceeded. The at least one beamforming resource set may comprise, for example, one or more beamforming codebooks. In this case, the message may be received from another user device or a network node of a radio access network.

In block 502, the apparatus selects at least one transmit beam direction from the at least one beamforming resource set.

For example, the message received in block 501 may further comprise information indicative of a ranking of a plurality of beamforming codebooks comprised in the at least one beamforming resource set. In this case, the at least one transmit beam direction may be selected at block 502 based at least partly on the ranking information.

In block 503, the apparatus determines whether the radiated power in the selected at least one transmit beam direction exceeds the maximum permissible exposure limit.

In block 504, if the radiated power of the selected at least one transmit beam direction does not exceed the maximum permissible exposure limit (block 503: no), then the apparatus transmits data in the selected at least one transmit beam direction. In this case, the data may be transmitted such that the maximum permissible exposure limit is not exceeded, and an expected received signal strength of the data is above a threshold.

For example, the message received in block 501 may comprise information indicative of at least one transmit power level corresponding to the selected at least one transmit beam direction, wherein the data may be transmitted based at least on the at least one transmit power level.

The message received in block 501 may also comprise beamshaping information corresponding to the selected at least one transmit beam direction, wherein the data may be transmitted based at least on the beamshaping information.

Alternatively, in block 505, if the radiated power in the selected at least one transmit beam direction exceeds the maximum permissible exposure limit (block 503: yes), then the apparatus may check if there are one or more other transmit beam directions available in the at least one beamforming resource set.

If there are one or more other transmit beam directions available in the at least one beamforming resource set (block 505: yes), then the process may return to block 502 and continue from there, i.e., the apparatus may select at least one other transmit beam direction from the at least one beamforming resource set (e.g., based on the ranking) and determine whether the radiated power in the at least one other transmit beam direction exceeds the maximum permissible exposure limit. In other words, the apparatus may iteratively or sequentially evaluate the transmit beam directions in the at least one beamforming resource set until the apparatus finds at least one transmit beam direction with which the maximum permissible exposure limit is not exceeded.

Alternatively, in block 506, if the maximum permissible exposure limit is exceeded with all of the transmit beam direction(s) of the at least one beamforming resource set (block 505: no), the apparatus may optimize one or more beam parameters, such as transmit power and/or beam shaping, to try to avoid exceeding the maximum permissible exposure limit in the selected at least one transmit beam direction. In this case, the selected at least one transmit beam direction for this optimization may comprise, for example, at least one non-DFT beam (e.g., a pseudorandom beam such as a Zadoff-Chu beam), since such beam patterns may reduce the radiated power compared to DFT beams, and thus any additional transmit power reductions, if needed, may be smaller. For example, the apparatus may estimate an electromagnetic field exposure in the selected at least one transmit beam direction and adjust a transmit power level in the selected at least one transmit beam direction such that the electromagnetic field exposure is below or equal to the maximum permissible exposure limit, and an expected received signal strength at the network node or the other user device is above a threshold.

In block 507, after optimizing the one or more beam parameters, the apparatus determines whether the radiated power in the selected at least one transmit beam direction exceeds the maximum permissible exposure limit.

If the radiated power of the selected at least one transmit beam direction does not exceed the maximum permissible exposure limit (block 507: no) after optimizing the one or more beam parameters, then the apparatus transmits data in the selected at least one transmit beam direction in block 504. In this case, the data may be transmitted such that the maximum permissible exposure limit is not exceeded, and an expected received signal strength of the data is above a threshold.

Alternatively, in block 508, if the MPE limit is still exceeded despite the optimization of block 506 (block 507: yes), then the apparatus may transmit, to the network node or the other user device, an indication indicating radio link failure and a request for a new beamforming resource set. In this case, the apparatus may indicate one or more preferred transmit beam directions in the indication in order to avoid successive radio link failure.

The blocks, related functions, and information exchanges (messages) described above by means of FIGS. 3-5 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 6 illustrates a normalized EIRP of a specific DFT beamforming sequence and a specific pseudorandom beamforming sequence. The plot in FIG. 6 shows the radians in the X-axis and Y-axis for the beamforming pattern. As shown by the arrow 600 in FIG. 6, a significant reduction in radiated power may be obtained with the pseudorandom beamforming sequence in comparison to the DFT beamforming sequence.

FIG. 7 illustrates simulated measurement results showing the achievable UL data rate performance of some example embodiments 701, 702 versus legacy P-MPR using DFT beam 703, 704. The results indicate that the achievable uplink data rate with the proposed MPE-compatible uplink beamformer (e.g., using Zadoff-Chu sequences) together with UE-specific activation, ranking, control, and/or selection criteria is superior compared to the legacy approach.

Figure 8:
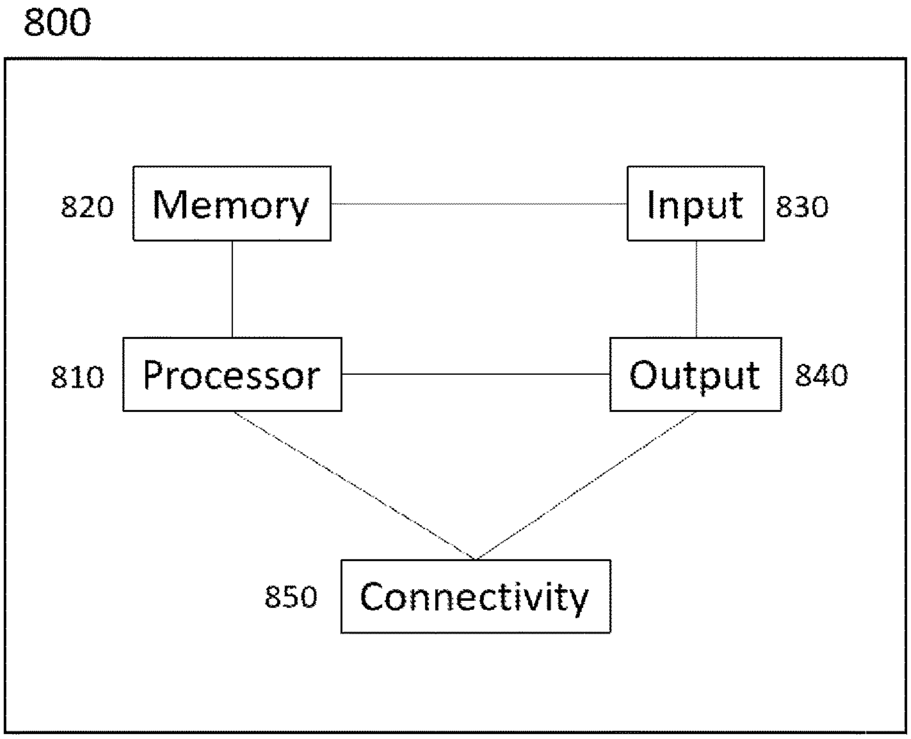
FIG. 8 illustrates an example of an apparatus.

FIG. 8 illustrates an example of an apparatus 800 comprising means for performing one or more of the example embodiments described above. For example, the apparatus 800 may be an apparatus such as, or comprising, or comprised in, a user device. The user device may also be called a wireless communication device, a subscriber unit, a mobile station, a remote terminal, an access terminal, a user terminal, a terminal device, or user equipment (UE). The user device may correspond to one of the UEs 100, 102 of FIG. 1, or the transmitter 200 or receiver 204 of FIG. 2, or UE1 or UE2 of FIG. 3.

The apparatus 800 may comprise a circuitry or a chipset applicable for realizing one or more of the example embodiments described above. For example, the apparatus 800 may comprise at least one processor 810. The at least one processor 810 interprets instructions (e.g., computer program instructions) and processes data. The at least one processor 810 may comprise one or more programmable processors. The at least one processor 810 may comprise programmable hardware with embedded firmware and may, alternatively or additionally, comprise one or more application-specific integrated circuits (ASICs).

The at least one processor 810 is coupled to at least one memory 820. The at least one processor is configured to read and write data to and from the at least one memory 820. The at least one memory 820 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 820 stores computer readable instructions that are executed by the at least one processor 810 to perform one or more of the example embodiments described above. For example, non-volatile memory stores the computer readable instructions, and the at least one processor 810 executes the instructions using volatile memory for temporary storage of data and/or instructions. The computer readable instructions may refer to computer program code.

The computer readable instructions may have been pre-stored to the at least one memory 820 or, alternatively or additionally, they may be received, by the apparatus, via an electromagnetic carrier signal and/or may be copied from a physical entity such as a computer program product. Execution of the computer readable instructions by the at least one processor 810 causes the apparatus 800 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 800 may further comprise, or be connected to, an input unit 830. The input unit 830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 830 may comprise an interface to which external devices may connect to.

The apparatus 800 may also comprise an output unit 840. The output unit may comprise or be connected to one or more displays capable of rendering visual content, such as a light emitting diode (LED) display, a liquid crystal display (LCD) and/or a liquid crystal on silicon (LCoS) display. The output unit 840 may further comprise one or more audio outputs. The one or more audio outputs may be for example loudspeakers.

The apparatus 800 further comprises a connectivity unit 850. The connectivity unit 850 enables wireless connectivity to one or more external devices. The connectivity unit 850 comprises at least one transmitter and at least one receiver that may be integrated to the apparatus 800 or that the apparatus 800 may be connected to. The at least one transmitter comprises at least one transmission antenna, and the at least one receiver comprises at least one receiving antenna. The connectivity unit 850 may comprise an integrated circuit or a set of integrated circuits that provide the wireless communication capability for the apparatus 800. Alternatively, the wireless connectivity may be a hardwired application-specific integrated circuit (ASIC). The connectivity unit 850 may also provide means for performing at least some of the blocks of one or more example embodiments described above. The connectivity unit 850 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 800 may further comprise various components not illustrated in FIG. 8. The various components may be hardware components and/or software components.

Figure 9:
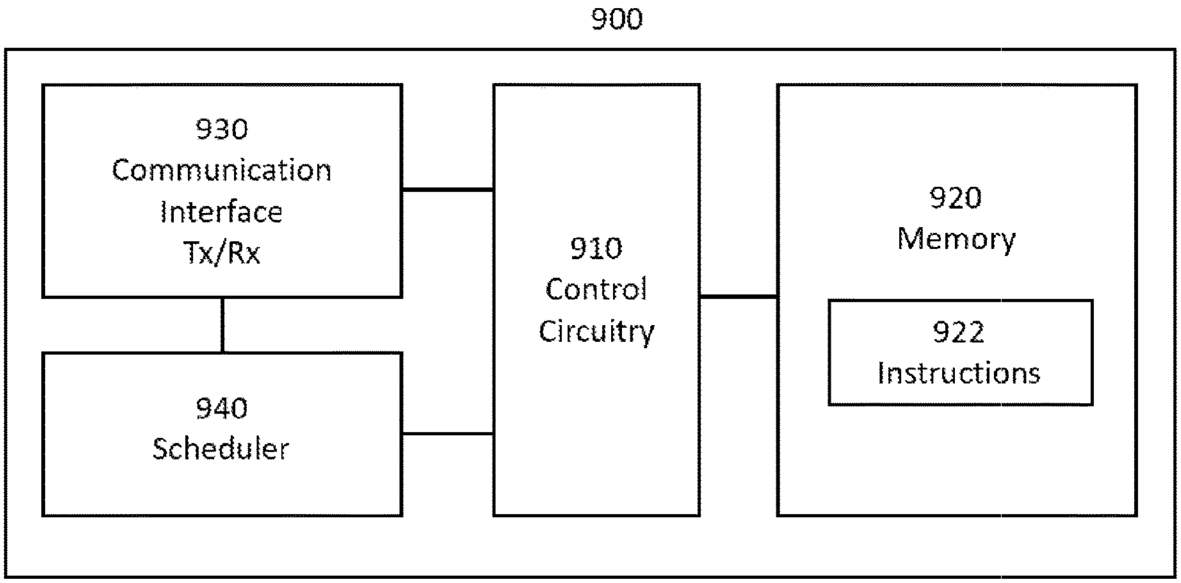
FIG. 9 illustrates an example of an apparatus.

FIG. 9 illustrates an example of an apparatus 900 comprising means for performing one or more of the example embodiments described above. For example, the apparatus 900 may be an apparatus such as, or comprising, or comprised in, a network node of a radio access network. The network node may correspond to the access node 104 of FIG. 1, or the receiver 204 of FIG. 2, or the gNB of FIG. 3.

The network node may also be referred to, for example, as a network element, a radio access network (RAN) node, a next generation radio access network (NG-RAN) node, a NodeB, an eNB, a gNB, a base transceiver station (BTS), a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 900 may comprise, for example, a circuitry or a chipset applicable for realizing one or more of the example embodiments described above. The apparatus 900 may be an electronic device comprising one or more electronic circuitries. The apparatus 900 may comprise a communication control circuitry 910 such as at least one processor, and at least one memory 920 storing instructions 922 which, when executed by the at least one processor, cause the apparatus 900 to carry out one or more of the example embodiments described above. Such instructions 922 may, for example, include computer program code (software). The at least one processor and the at least one memory storing the instructions may provide the means for providing or causing the performance of any of the methods and/or blocks described above.

The processor is coupled to the memory 920. The processor is configured to read and write data to and from the memory 920. The memory 920 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 920 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 900 may further comprise or be connected to a communication interface 930, such as a radio unit, comprising hardware and/or software for realizing communication connectivity with one or more wireless communication devices according to one or more communication protocols. The communication interface 930 comprises at least one transmitter (Tx) and at least one receiver (Rx) that may be integrated to the apparatus 900 or that the apparatus 900 may be connected to. The communication interface 930 may provide means for performing some of the blocks for one or more example embodiments described above. The communication interface 930 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 930 provides the apparatus with radio communication capabilities to communicate in the wireless communication network. The communication interface may, for example, provide a radio interface to one or more wireless communication devices. The apparatus 900 may further comprise or be connected to another interface towards a core network such as the network coordinator apparatus or AMF, and/or to the access nodes of the cellular communication system.

The apparatus 900 may further comprise a scheduler 940 that is configured to allocate radio resources. The scheduler 940 may be configured along with the communication control circuitry 910 or it may be separately configured.

It is to be noted that the apparatus 900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:

obtain measurement information comprising radio environment measurements associated with a user device, wherein the measurement information comprises a reference signal received power (RSRP), an angle of arrival (AoA), and channel state information reference signal (CSI-RS) measurements;

determine, based at least on the measurement information and a maximum permissible exposure limit:

one or more beamforming resource sets for the user device such that the maximum permissible exposure limit is not exceeded with at least one beamforming resource set of the one or more beamforming resource sets, wherein the at least one beamforming resource set comprises a Zadoff-Chu-based beamforming codebook and a discrete Fourier transform (DFT)-based beamforming codebook, one or more transmit power levels corresponding to the one or more beamforming resource sets such that the maximum permissible exposure limit is not exceeded, and beamshaping information corresponding to the at least one beamforming resource set;

determine a ranking of a plurality of beamforming codebooks comprised in the at least one beamforming resource set, wherein the ranking prioritizes the DFT-based beamforming codebook when the maximum permissible exposure limit is not exceeded and prioritizes the Zadoff-Chu-based beamforming codebook when the maximum permissible exposure limit is exceeded;

determine, based on the maximum permissible exposure limit, one or more criteria for selecting at least one transmit beam direction from a plurality of transmit beam directions indicated in the at least one beamforming resource set, wherein the one or more criteria include maintaining a line-of-sight (LoS) or shortest time-of-flight (ToF) path while reducing radiated power to satisfy the maximum permissible exposure limit;

transmit information indicative of the one or more beamforming resource sets to a network entity;

receive information indicating a subset of the one or more beamforming resource sets from the network entity, wherein the subset is selected based on at least one of inter-cell interference or intra-cell interference considerations;

transmit a message indicative of the at least one beamforming resource set to be used for selecting the at least one transmit beam direction at the user device in case the maximum permissible exposure limit is exceeded, wherein the message comprises:

information indicative of at least one transmit power level corresponding to the at least one transmit beam direction, the beamshaping information, information indicating the subset, information indicative of the ranking, information indicative of the one or more criteria;

receive, from the user device, an indication indicating the at least one transmit beam direction selected from the at least one beamforming resource set;

determine at least one receive beam based on the indication;

receive a data from the user device via the at least one receive beam; and transmit a report message indicating the at least one receive beam and the at least one transmit beam direction selected by the user device.

* * * * *